United States Patent
Chen

(10) Patent No.: US 9,468,196 B2
(45) Date of Patent: Oct. 18, 2016

(54) STRAP RELEASING CONTROL MECHANISM FOR PET LEASH

(71) Applicant: Dongguan City Jiasheng Enterprise Co., Ltd., Guangdong (CN)

(72) Inventor: Silong Chen, Guangdong (CN)

( * ) Notice: Subject to any disclaimer, the term of this patent is extended or adjusted under 35 U.S.C. 154(b) by 0 days.

(21) Appl. No.: 14/758,250

(22) PCT Filed: Jan. 8, 2015

(86) PCT No.: PCT/CN2015/070307
§ 371 (c)(1),
(2) Date: Jun. 29, 2015

(87) PCT Pub. No.: WO2016/061913
PCT Pub. Date: Apr. 28, 2016

(65) Prior Publication Data
US 2016/0249590 A1    Sep. 1, 2016

(30) Foreign Application Priority Data
Oct. 23, 2014 (CN) .......................... 2014 1 0568258

(51) Int. Cl.
| | |
|---|---|
| A01K 27/00 | (2006.01) |
| A44B 11/00 | (2006.01) |
| B65H 75/40 | (2006.01) |
| B65H 75/48 | (2006.01) |
| A44B 11/25 | (2006.01) |

(52) U.S. Cl.
CPC ........... *A01K 27/004* (2013.01); *B65H 75/406* (2013.01); *B65H 75/48* (2013.01); *A44B 11/2503* (2013.01)

(58) Field of Classification Search
CPC . E05B 75/00; E05B 73/0005; A01K 27/005; A01K 27/004; A01K 27/001; A01K 27/003; Y10T 24/4501; Y10T 24/45084; A44B 11/2557; A44B 11/26

USPC ............... 119/792, 776, 789, 793, 797, 863; 24/484, 573.11, 579.11, 602, 614

See application file for complete search history.

(56) References Cited

U.S. PATENT DOCUMENTS

| | | | | |
|---|---|---|---|---|
| 3,867,905 A | * | 2/1975 | Vail, Jr. ............... | A01K 27/005 119/793 |
| 4,228,568 A | * | 10/1980 | Frost .................. | A44B 11/2557 24/579.11 |
| 4,813,111 A | * | 3/1989 | Nohren ................. | B64D 17/32 24/573.11 |
| 5,141,074 A | * | 8/1992 | Sulowski ........... | A62B 35/0031 182/133 |
| 5,377,510 A | * | 1/1995 | Smith ................ | A61B 17/1327 128/878 |
| 5,794,461 A | * | 8/1998 | Smith ................ | B65D 63/1072 292/318 |
| 6,007,053 A | * | 12/1999 | Huang .................... | B60P 7/083 254/223 |
| 6,095,094 A | * | 8/2000 | Phillips ................ | A01K 27/001 119/792 |

(Continued)

*Primary Examiner* — Yvonne Abbott-Lewis
(74) *Attorney, Agent, or Firm* — Prakash Nama; Global IP Services, PLLC

(57) ABSTRACT

A strap releasing control mechanism for pet leash includes a shell (1), a press key (2), a slide key (3), a slide block (4) and a stop member (5); a key hole (11) is opened on the shell (1); a channel (6) is provided inside the shell (1) and the channel (6) connects and communicates with the key hole (11); the channel (6) is provided with a lock member (10) and a guiding panel (7); a stop member (5) is provided inside the channel (6); a key accommodating hole (9) is opened on the slide key (3); the press key (2) is inserted into the channel (6) through the key accommodating hole (9); a lower end of the press key (2) is provided with a connecting member (12) which is connected to the slide block (4); a lower end of the slide block (4) abuts against the stop member (5).

4 Claims, 2 Drawing Sheets

(56) References Cited

U.S. PATENT DOCUMENTS

| | | | | |
|---|---|---|---|---|
| 6,148,773 A * | 11/2000 | Bogdahn | ............... | B65H 75/44 119/794 |
| 6,205,956 B1 * | 3/2001 | Dickie | ............... | A01K 27/005 119/776 |
| 6,446,474 B1 * | 9/2002 | Tabacchi | ............ | B65D 63/1027 128/869 |
| 6,687,964 B2 * | 2/2004 | Vanderpool | ............ | A44B 11/26 24/265 BC |
| 6,904,872 B2 * | 6/2005 | Muller | ............... | B65H 75/4431 119/789 |
| 9,328,539 B1 * | 5/2016 | Lonardo | ............... | E05B 75/00 |
| 9,340,997 B2 * | 5/2016 | Zuraski | ............... | B62H 5/00 |

\* cited by examiner

STRAP RELEASING CONTROL MECHANISM FOR PET LEASH

BACKGROUND OF THE INVENTION

The present invention relates to a strap releasing control mechanism. Specifically, the present invention relates to a control mechanism used by a pet leash for controlling extension and retraction of a strap thereof.

In modern society, many families keep pets such as cats and dogs. Pet owners often walk their pets outdoors where pet leashes will be required. Therefore, pet leashes are used extensively.

A pet leash now available in the market usually comprises a shell, a strap winder and a strap releasing control mechanism. The strap is released through a strap opening provided on the shell. In actual use, the length of strap to be released has to be adjusted from time to time by operating the strap releasing control mechanism. Therefore, user's experience of the pet leash will be directly affected by whether the strap releasing control mechanism is convenient to use.

There are two types of strap releasing control mechanism for a pet leash. The first type only comprises two operating conditions, namely an unlock condition and a lock condition. This first type of strap releasing control mechanism has a relatively simple structure and usually uses a slide key or a press key for locking and unlocking the strap. This type of strap releasing control mechanism has poor flexibility of control. In actual use, multiple adjustments of the strap have to be made when only two operating conditions are available for adjustment because the pet is always moving and so its positions with respect to the owner holding the pet leash change from time to time. Repeated operation of a slide key is difficult and effort draining, and such repeated operation also affects the service life of the slide key. The second type of strap releasing control mechanism comprises three operating conditions, namely an unlock condition, a lock condition and a halt condition. The second type has a more complicated structure than the first type, and it is usually controlled by a combined use of sliding and pressing control. In actual use, a halt condition can be effected during extension or retraction of the strap based on practical needs. This second type of strap releasing control mechanism has good flexibility of control but it is still poor in its working stability and its overall smoothness during its operation. Hence, this second type of strap releasing control mechanism cannot satisfactorily meet consumer's needs. In particular, this second type of strap releasing control mechanism has a relatively more complicated structure and has relatively more components, furthermore, it is not convenient to use because another sliding key or press key has to be used to achieve locking after halt in this type of strap releasing control mechanism realizing halt, lock and unlock conditions.

In view of the above, the market requires a strap releasing control mechanism of a pet leash which is convenient and smooth to operate and which has a simple structure realizing all the three operating conditions.

BRIEF SUMMARY OF THE INVENTION

In view of the aforesaid disadvantages now present in the existing strap releasing control mechanism of a pet leash realizing all the three operating conditions, the present invention provides a simple-structured strap releasing control mechanism which is convenient and smooth to operate by combining integrally as a whole the control keys that control the halt, lock and unlock operating conditions.

The present invention adopts the following technical proposal to attain the above object:

A strap releasing control mechanism for pet leash comprises a shell, a press key, a slide key, a slide block and a stop member.

A key hole is opened on the shell.

A channel is provided inside the shell and the channel connects and communicates with the key hole. A left side of the channel is provided with a lock member. A right side of the channel is provided with a guiding panel.

A stop member is provided inside the channel via a rotation shaft. A reset spring is sleeved on the rotation shaft.

The slide key is fitted to the key hole on the shell through a groove disposed at each of two sides of the slide key. The slide key is slidable back and forth at the key hole.

A key accommodating hole which is a through hole is opened on the slide key. The press key is inserted into the channel through the key accommodating hole. A lower end of the press key is provided with a connecting member. The connecting member is connected to the slide block via matching of axial holes.

The slide block cooperates with the guiding panel. A lower end of the slide block abuts against the stop member.

The present invention has a simple structure, reasonable design and good working stability. The present invention combines integrally as a whole a slide key and a press key to achieve the halt, lock and unlock operating conditions of the strap releasing control mechanism of the pet leash. The present invention is convenient to use.

DETAILED DESCRIPTION OF THE INVENTION

Figure 1:
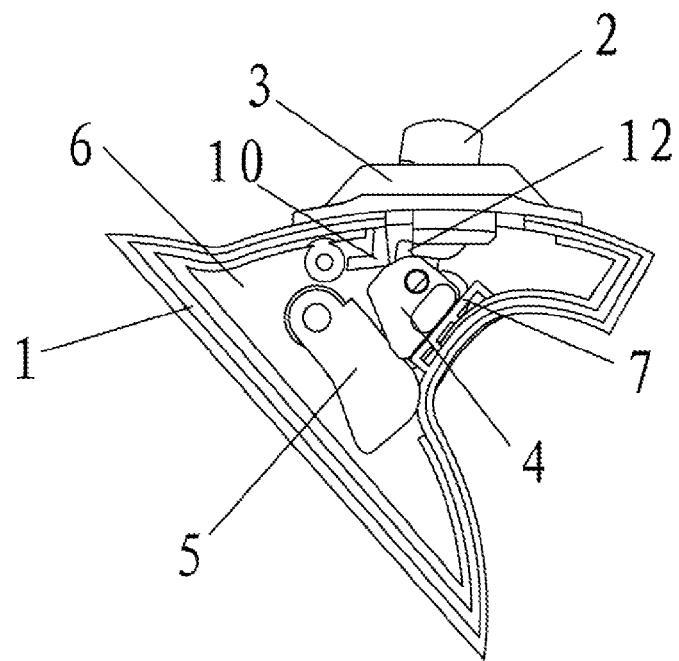
FIG. 1 is a structural view of the present invention.
Figure 2:
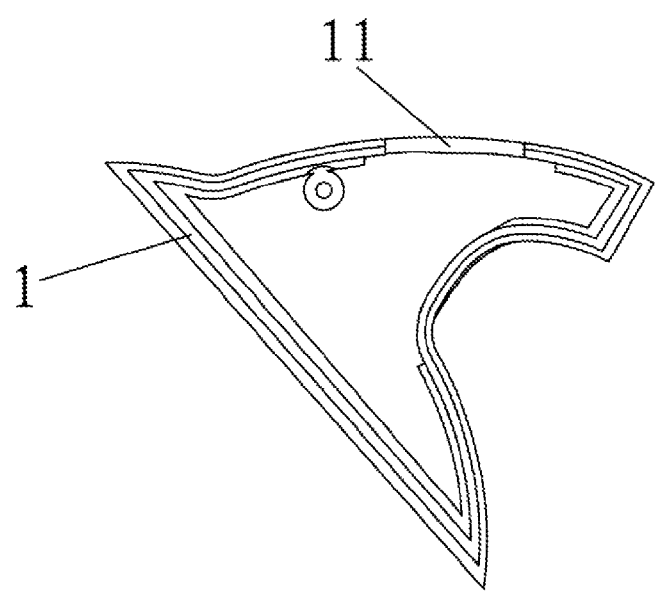
FIG. 2 is a structural view of the shell.
Figure 3:
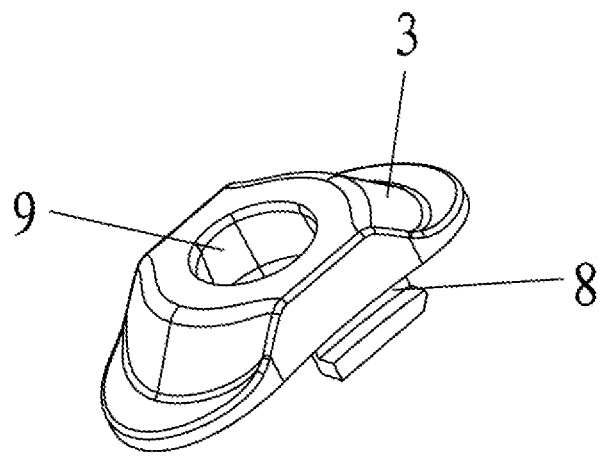
FIG. 3 is a structural view of the slide key.
Figure 4:
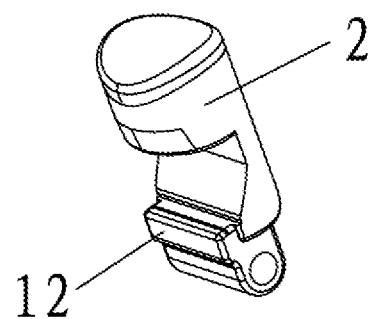
FIG. 4 is a structural view of the press key.
REFERENCE SIGNS IN THE FIGURES
(1) shell; (2) press key; (3) slide key; (4) slide block; (5) stop member; (6) channel; (7) guiding panel; (8) groove; (9) key accommodating hole; (10) lock member; (11) key hole; (12) connecting member.

For further understanding of the present invention, the present invention is further described below with reference to an embodiment and FIGS. 1-4.

Embodiment

As shown in FIGS. 1-4, the present invention comprises a shell 1, a press key 2, a slide key 3, a slide block 4 and a stop member 5.

A key hole 11 is opened on the shell 1.

A channel 6 is provided inside the shell 1 and the channel 6 connects and communicates with the key hole 11. A left side of the channel 6 is provided with a lock member 10. A right side of the channel 6 is provided with a guiding panel 7. The lock member 10 has a laterally reversed "L" shape.

A stop member 5 is provided inside the channel 6 via a rotation shaft. A reset spring is sleeved on the rotation shaft.

The slide key 3 is fitted to the key hole 11 on the shell 1 through a groove 8 disposed at each of two sides of the slide key 3. The slide key 3 is slidable back and forth at the key hole 11.

A key accommodating hole 9 which is a through hole is opened on the slide key 3. The press key 2 is inserted into the channel 6 through the key accommodating hole 9. A lower end of the press key 2 is provided with a connecting member 12. The connecting member 12 is connected to the slide block 4 via matching of axial holes.

The slide block 4 cooperates with the guiding panel 7. A lower end of the slide block 4 abuts against the stop member 5.

According to an implementation of the present invention, when the press key 2 and the slide key 3 are at their starting positions, the strap releasing control mechanism is in an unlocked condition which allows the strap to move freely. When the press key 2 is pressed downwardly, the connecting member 12 provided at the lower end of the press key 2 drives the slide block 4 to slide downwardly along the guiding panel 7. Since the slide block 4 abuts against and therefore contacts with the stop member 5, downward sliding of the slide block 4 will cause the slide block 4 to drive the stop member 5 to rotate downwardly along its rotation shaft. The stop member 5 will then contact with the strap and achieve halt condition which allows quick adjustment of the length of the strap being released. When locking is required after adjustment, the slide key 3 is pushed forward to slide forward at the time when the press key 2 is pressed downwardly to a predetermined position. Accordingly, the connecting member 12 provided on the press key 2 is partially engaged to a position below the lock member 10. After that, due to the function of the reset spring on the rotation shaft of the stop member 5, the connecting member 12 abuts against the lock member 10 and is locked against the lock member 10, and thus achieving a locked condition.

The above description is only a more preferred embodiment of the present invention. It is not intended to limit the present invention. Any person skilled in this field of art may implement other embodiments of equivalent effect by employing equivalent alternatives obtained by changing or modifying the technical contents of the present invention. Any simple changes and alteration and modification having equivalent effect done to the above described embodiment in accordance with the essence of the present invention should be considered technical contents not deviated from the present invention and should therefore fall within the scope of the present invention.

What is claimed is:

1. A strap releasing control mechanism for pet leash comprising a shell, a press key, a slide key, a slide block and a stop member; a key hole is opened on the shell; a channel is provided inside the shell and the channel connects and communicates with the key hole; a left side of the channel is provided with a lock member; a right side of the channel is provided with a guiding panel; a stop member is provided inside the channel via a rotation shaft; a key accommodating hole which is a through hole is opened on the slide key; the press key is inserted into the channel through the key accommodating hole; a lower end of the press key is provided with a connecting member; the connecting member is connected to the slide block via matching of axial holes; the slide block cooperates with the guiding panel; a lower end of the slide block abuts against the stop member.

2. The strap releasing control mechanism for pet leash as in claim 1, wherein a reset spring is sleeved on the rotation shaft of the stop member.

3. The strap releasing control mechanism for pet leash as in claim 1, wherein the slide key is fitted to the key hole on the shell through a groove disposed at each of two sides of the slide key.

4. The strap releasing control mechanism for pet leash as in claim 1, wherein the lock member has a laterally reversed "L" shape.

* * * * *